US008802987B2

(12) United States Patent
Morikawa et al.

(10) Patent No.: US 8,802,987 B2
(45) Date of Patent: Aug. 12, 2014

(54) ELECTRIC WIRE EQUIPPED WITH TERMINAL FITTING AND METHOD OF MANUFACTURING THE SAME

(75) Inventors: Satoshi Morikawa, Yokkaichi (JP); Kazumasa Kobayashi, Yokkaichi (JP); Takuji Otsuka, Yokkaichi (JP); Hiroki Shimoda, Yokkaichi (JP)

(73) Assignees: AutoNetworks Technologies, Ltd., Yokkaichi (JP); Sumitomo Wiring Systems, Ltd, Yokkaichi (JP); Sumitomo Electric Industries, Ltd, Osaka (JP)

( * ) Notice: Subject to any disclaimer, the term of this patent is extended or adjusted under 35 U.S.C. 154(b) by 200 days.

(21) Appl. No.: 13/635,188

(22) PCT Filed: Mar. 11, 2011

(86) PCT No.: PCT/JP2011/055750

§ 371 (c)(1),
(2), (4) Date: Sep. 14, 2012

(87) PCT Pub. No.: WO2011/122302

PCT Pub. Date: Oct. 6, 2011

(65) Prior Publication Data

US 2013/0008714 A1 Jan. 10, 2013

(30) Foreign Application Priority Data

Mar. 30, 2010 (JP) ................................ 2010-078128

(51) Int. Cl.

| | |
|---|---|
| ***H02G 15/02*** | (2006.01) |
| ***H01R 43/05*** | (2006.01) |
| ***H01R 4/70*** | (2006.01) |
| ***H01R 4/20*** | (2006.01) |
| *H01R 4/62* | (2006.01) |
| *H01R 4/18* | (2006.01) |

(52) U.S. Cl.

CPC .. *H01R 4/20* (2013.01); *H01R 4/70* (2013.01); *H01R 4/62* (2013.01); *H01R 4/185* (2013.01)

USPC ....... 174/74 R; 174/68.1; 174/77 R; 439/865; 439/877; 439/203; 29/867

(58) Field of Classification Search

USPC ........... 174/74 R, 68.1, 68.3, 72 A, 263, 73.1, 174/77 R, 84 C, 96, 98; 439/203, 865, 866, 439/867, 877, 878; 29/867

See application file for complete search history.

(56) References Cited

U.S. PATENT DOCUMENTS

| | | | | |
|---|---|---|---|---|
| 5,025,554 A * | 6/1991 | Dohi | ............................ | 439/877 |
| 5,486,653 A * | 1/1996 | Dohi | ............................ | 439/877 |

(Continued)

FOREIGN PATENT DOCUMENTS

| | | |
|---|---|---|
| JP | H03-55663 | 5/1991 |
| JP | 2010-20980 | 1/2001 |

(Continued)

*Primary Examiner* — Angel R Estrada

(74) *Attorney, Agent, or Firm* — Gerald E Hespos; Michael J Porco; Matthew T Hespos

(57) ABSTRACT

An aluminum electric wire (10) has a metallic core wire (11) coated with an insulation coating (13). A female terminal fitting (20) made of metal different from the core wire (11) has a wire barrel (25) to be connected to the aluminum electric wire (10). A solder seal (30) is formed of solder having a main component with an ionizing tendency close to that of the terminal fitting. The wire barrel (25) is crimped to the core wire (11) exposed by peeling off the insulation coating (13) of the aluminum electric wire (10) and partially sealed with the solder. A seal connection portion (14) connects the insulation coating (13), the exposed core wire (11) and the solder seal (30) to each other in a condition where the coating (13) and the solder seal (30) are sealed off from each other.

13 Claims, 10 Drawing Sheets

(56) References Cited

U.S. PATENT DOCUMENTS

| | | | | | |
|---|---|---|---|---|---|
| 5,519,170 | A * | 5/1996 | Nabeshima | 174/74 R |
| 5,532,433 | A * | 7/1996 | Endo et al. | 174/77 R |
| 5,772,454 | A * | 6/1998 | Long, Jr. | 439/877 |
| 6,334,798 | B1 * | 1/2002 | Ushijima et al. | 439/877 |
| 7,705,265 | B2 * | 4/2010 | Asakura et al. | 439/877 |
| 7,905,755 | B1 * | 3/2011 | Martauz | 439/877 |
| 8,622,776 | B2 * | 1/2014 | Morikawa et al. | 439/886 |
| 8,723,040 | B2 * | 5/2014 | Sakura | 174/74 R |

FOREIGN PATENT DOCUMENTS

| | | |
|---|---|---|
| JP | 2004-71437 | 3/2004 |
| JP | 2005-50736 | 2/2005 |
| JP | 2007-250393 | 9/2007 |
| JP | 2008-296871 | 12/2008 |
| WO | 2010/016515 | 2/2010 |

* cited by examiner

ELECTRIC WIRE EQUIPPED WITH TERMINAL FITTING AND METHOD OF MANUFACTURING THE SAME

BACKGROUND OF THE INVENTION

1. Field of the Invention

The present invention relates to an electric wire equipped with a terminal fitting and a method of manufacturing the electric wire equipped with a terminal fitting.

2. Description of the Related Art

In the recent years, aluminum electric wires have been used for reducing weight in the field of wire harnesses for use in an automobile. The aluminum electric wire has a configuration where a core wire obtained by twisting a plurality of aluminum strands is coated with an insulation coating. Thus, in the case to be used as a harness, a terminal fitting is connected to the end of the electric wire generally. Specifically, the end of the coating for the electric wire is peeled to expose the end of the core wire, a wire barrel (electric wire connection portion) provided on the terminal fitting is crimped to thus-exposed end of the core wire, and an insulation barrel provided in the rear of the wire barrel is crimped to a non-removed end of the insulation coating for the electric wire to be connected (see, for example, Japanese Unexamined Patent Publication No. 2005-50736).

In a configuration where the core wire of the electric wire and the terminal fitting are made of different kinds of metals, in particular, when water exists at a portion where the two come in contact with each other when the electric wire is electrically connected to the terminal fitting, it is known that the metals both dissolve in the water in the shape of ions to give rise to electric corrosion in which corrosion makes progress by electrochemical reaction. The terminal fittings are typically made of copper alloy in terms of strength. Therefore, when the electric wire is made of aluminum as above, electric corrosion occurs. Specifically, when salt content in which dust and sand are entered, as well as water, the portion where the wire barrel is crimped to the core wire is immersed in an electrolyte solution. Therefore, this provides a possibility that aluminum having a strong ionization tendency dissolves, that is, electric corrosion makes progress.

Accordingly, to prevent the occurrence of electric corrosion, conventionally, an anti-corrosive agent containing silicone rubber, chelator, etc. has been applied to the portion where the wire barrel is crimped.

This anti-corrosive applying method has a lot of problems including: necessity of changing application conditions depending on the shape in which the barrel is crimped; instability of quality due to fluctuations in thickness of an application; necessity of paying attention to the application layer not to be peeled off; and moreover, difficulty in repair at the time of maintenance. Therefore, there has been a strong demand for new countermeasures.

The present invention was made in view of the foregoing circumstances. It is an object of the present invention to securely prevent electric corrosion on a portion where the electric wire and the terminal fitting are connected to each other, without using anti-corrosive agents.

SUMMARY OF THE INVENTION

An electric wire equipped with a terminal fitting according to the present invention includes: an electric wire including a metallic core wire coated with a coating; a terminal fitting made of a metal different from the metallic core wire; a solder seal formed of a solder containing a metal having an ionization tendency close to that of the terminal fitting as a main component; and a seal connection portion. The terminal fitting includes an electric wire connection portion connected to the electric wire. The solder seal seals an exposed portion of the metallic core wire that is exposed by removing a part of the coating of the electric wire. The electric wire connection portion is crimped on the solder seal. The seal connection portion connects the coating adjacent to the exposed portion of the metallic core wire and the solder seal to each other in a sealed manner.

In this configuration, an area from the exposed core wire to the coating continuing to this core wire is covered with the solder seal and the seal connection portion, thereby protecting the exposed core wire from water. Further, the space between the coating continuing to the exposed core wire and the solder seal are sealed by the seal connection portion, thereby preventing water from entering the solder seal. Then, the electric wire connection portion of the terminal fitting is crimped to the solder seal, whereby the core wire and the terminal fitting are electrically connected to each other.

At the crimping portion of the wire connection portion, the metal pieces having the close ionization tendencies come in contact with each other. Therefore, even when water attaches to the portion, electric corrosion hardly occurs. On the other hand, the solder seal and the core wire are made of the different kinds of metals; however, the portion where they come in contact with each other, that is, the solder seal is protected from water and, therefore, is not subject to electric corrosion. As a result, it is possible to securely prevent electric corrosion on the portion where the electric wire and the terminal fitting are connected to each other, without using anti-corrosive agents.

According to the present invention, it is possible to securely prevent electric corrosion on the portion where the electric wire and the terminal fitting are connected to each other, without using anti-corrosive agents.

DETAILED DESCRIPTION OF THE PREFERRED EMBODIMENTS

Figure 1:
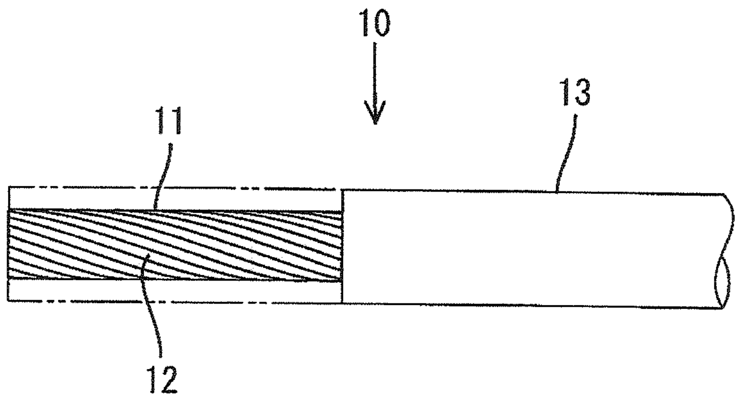
FIG. 1 is a side view showing a state where an insulation coating is removed from a terminal of an aluminum electric wire in a first embodiment.

A first embodiment of the present invention will be described with reference to FIGS. 1 to 6. The present embodiment exemplifies a configuration where the present invention is applied to an aluminum electric wire 10. The present invention exemplifies an aluminum electric wire equipped with a female terminal fitting including an aluminum electric wire 10, a female-side terminal fitting 20 (hereinafter referred to as female terminal fitting 20), a solder seal 30, and a seal connection portion 14 as shown in FIG. 3.

Figure 2:
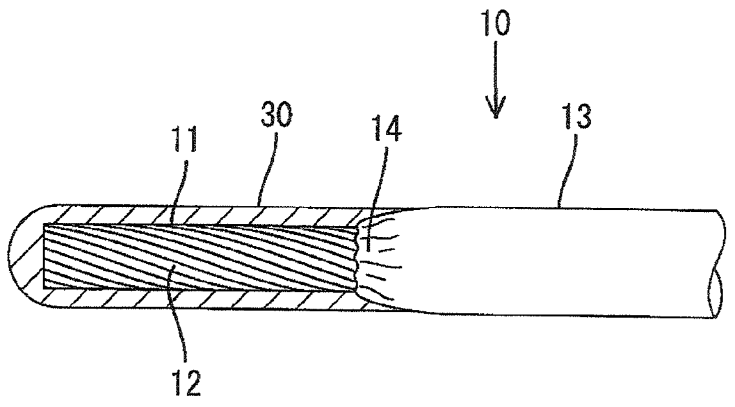
FIG. 2 is a side view showing a state where a solder seal is formed by soldering an exposed core wire in FIG. 1.
Figure 4:
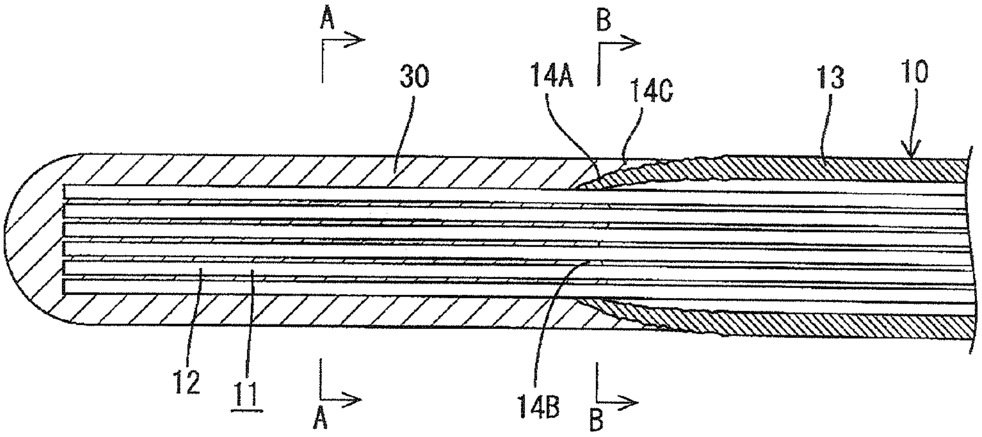
FIG. 4 is a cross-sectional view showing an internal structure of the solder seal.
Figure 5:
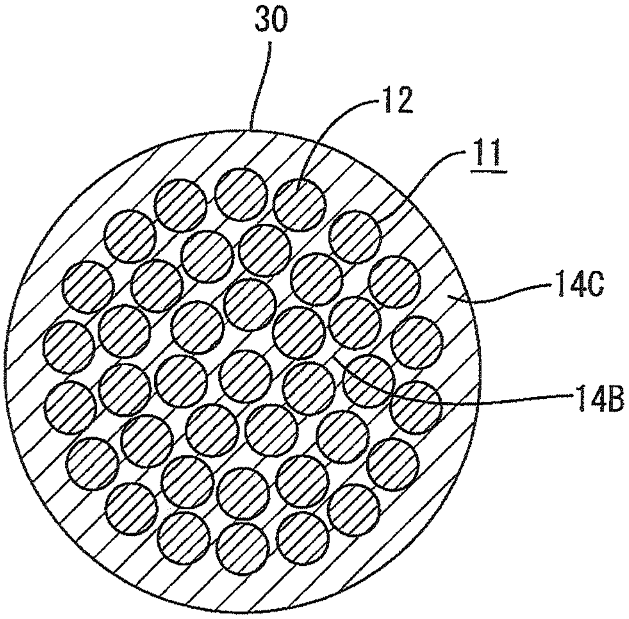
FIG. 5 is a cross-sectional view taken along line A-A of FIG. 4.

As shown in FIG. 1, the aluminum electric wire 10 has a configuration where a core wire 11 is formed of a twisted wire obtained by twisting a plurality of strands 12 made of aluminum or aluminum alloy and coated with an insulation coating 13 made of synthetic resin. The insulation coating 13 is made of resin, for example, synthetic resin including vinyl chloride (melting point: 180° C.), which can be welded thermally. The end of the insulation coating 13 of the aluminum electric wire 10 is peeled off to expose the core wire by a predetermined length. As shown in FIG. 2, the solder seal 30 is provided in a manner to enclose the end of the exposed core wire 11. As shown in FIGS. 4 and 5, the solder seal 30 impregnates not only the surface of the core wire 11, but also a gap between a plurality of strands 12 in the core wire 11. Further, the solder seal 30 includes a solder coat 14C and a solder impregnation portion 14B. The solder coat 14C is attached to the outer circumferential surface of the core wire 11. The solder impregnation portion 14B is an impregnated gap between the strands 12.

The female terminal fitting 20 is formed by pressing a plate material made of copper alloy and has a configuration where a wire barrel 25 and an insulation barrel 26 are provided in the rear of a substantially square tubular-shaped terminal connection portion 21 electrically connected to a mating male terminal fitting (not shown). The wire barrel 25 as well as the insulation barrel 26 and the later-described bottom plate 22 constitute the electric wire connection portion of the present invention.

Figure 3:
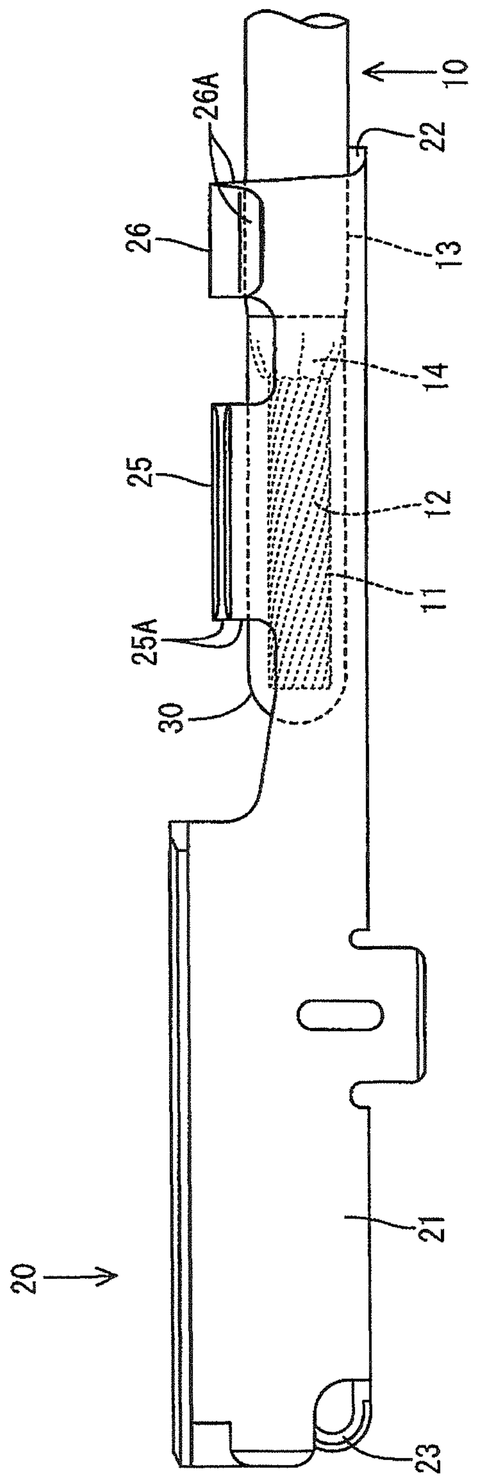
FIG. 3 is a side view showing a state where a wire barrel is crimped to the solder wire in FIG. 2 and an insulation barrel is crimped to the remaining insulation coating.

Inside the terminal connection portion 21, as shown in FIG. 3, a flexible contact piece 23 is formed by folding back the leading edge of the bottom plate 22; therefore, the tab of the mating male terminal fitting is inserted into this terminal connection portion from the front side. Thus, the female terminal fitting 20 may come in elastically contact with this flexible contact piece 23, whereby the male terminal fitting and the female terminal fitting 20 are electrically connected to each other.

First the solder seal 30 will be described as follows. The solder seal 30 includes the female terminal fitting 20 and solder having metal, as a main component, with an ionization tendency close to that of the female terminal fitting 20. The employed solder is free of lead and, specifically, may be of the Sn-Ag-Cu (tin-silver-copper) base, the Sn-Cu (tin-copper) base, or the Sn-Zn (tin-zinc) base. The Sn-Ag-Zn based lead-free solder has a melting point of 220° C., which is significantly higher than the melting point (183° C.) of the conventional lead-containing solder. Therefore, at the melting point of the solder, the insulation coating 13 is heated to the temperature higher than the melting point (180° C.) and, therefore, melted.

The solder seal 30 encloses the end of the core wire 11 exposed by peeling off the insulation coating 13 of the aluminum electric wire 10 by using the solder, thereby sealing the core wire 11 such that the core wire 11 may not be exposed to air. On the end of the remaining insulation coating 13, the seal connection portion 14 is formed. The seal connection portion 14 connects the end of the remaining insulation coating 13 and the solder seal 30 to each other in condition where the two are sealed off from each other. Although the solder seal 30 is crimped by the wire barrel 25 by overlap-crimping method as shown in FIG. 3, crimping conditions are set to prevent the solder seal 30 from cracking due to this crimping.

The wire barrel 25 provided on the female terminal fitting 20 is the open-barrel type. In the open-barrel type, a pair of right and left wide barrel segments 25A is formed so as to rise respectively from the right and left side edges of the bottom plate 22 such that the wide barrel segments 25A may face each other. The wire barrel 25 is crimped and crimped to the solder seal 30. The wire barrel 25 is crimped into a so-called overlapping type. With this overlapping type, the outer circumference of the solder seal 30 may be embraced from the right and left sides while permitting the projecting ends of the two barrel segments 25A to overlap each other as described above.

The insulation barrel 26 is similarly of the open-barrel type where a pair of right and left barrel segments 26A having a width smaller and a height higher than the barrel segments 25A of the wire barrel 25 is similarly formed so as to rise respectively from the right and left side edges of the bottom plate 22 such that the barrel segments 26A may face each other. The insulation barrel 26 is crimped and crimped to an area of the solder seal 30 crimped to the end of the insulation coating 13 in the overlapping type similarly.

Figure 6:
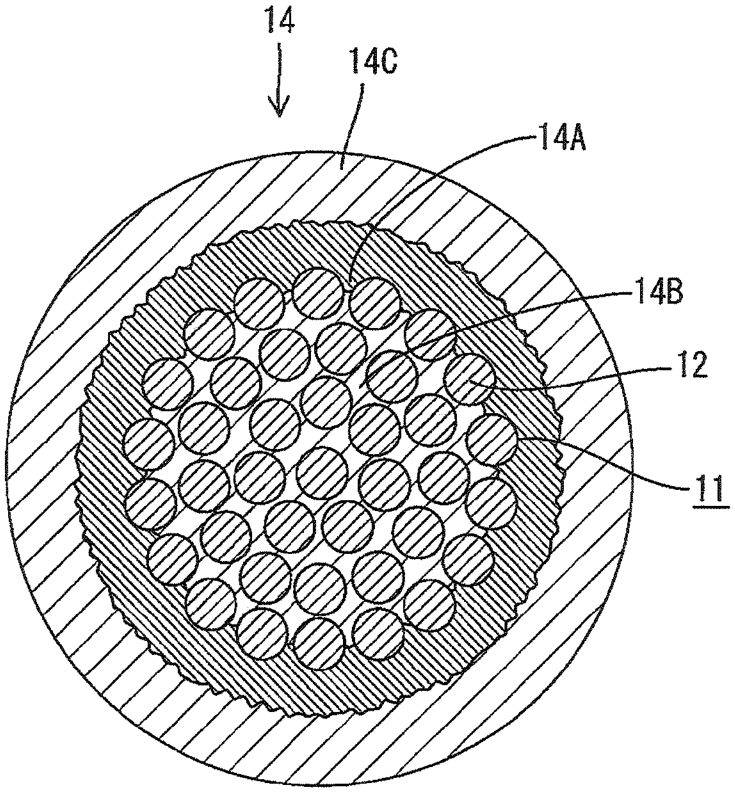
FIG. 6 is a cross-sectional view taken along line B-B of FIG. 4.

The seal connection portion 14 is formed integrally with the end of the insulation coating 13 remaining from the peeling, and continues to the end of the remaining insulation coating 13. The seal connection portion 14 is obtained when the end of the insulation coating 13 is melted by heat from the solder melted during the formation of the solder seal 30 and those molten insulation coating 13 and solder are cooled to be solidified as shown in FIG. 6. That is, the seal connection portion 14 includes the solder impregnation portion 14B, a coating penetration portion 14A, and the solder coat 14C in this order from the shaft center side. The solder impregnation portion 14B has a gap between the strands 12 filled with molten solder. The coating penetration portion 14A has a gap between the strands 12 penetrated with the end of the insulation coating 13.

As shown in FIG. 4, the seal connection portion 14 has a configuration such that the coating penetrated portion 14A made the front end outer circumferential surface of the insulation coating 13 bite in the solder coat 14C in a obliquely forward direction. As a result, outside the core wire 11, the front end outer circumferential surface of the insulation coating 13 and the solder coat 14C come in close contact with each other at the boundaries to thereby form a seal portion. The seal portion is formed in a direction orthogonal to the axial direction of the core wire 11 when the coating penetrated portion 14A is not formed. On the other hand, the seal portion is formed so as to extend in an obliquely forward direction when the coating penetrated portion 14A is formed. Thus, the seal portion is made longer when the coating penetrated portion 14A is formed. As a result, the seal portion can be longer and have enhanced sealing performance. Moreover, since the seal portion is formed also inside the core wire 11 because the coating penetrated portion 14A is in close contact with the solder impregnation portion 14B, the sealing performance is enhanced all the more. In such a manner, the coupling portion for the solder seal 30 and the remaining insulation coating 13 is sealed by the seal connection portion 14. Therefore, water is inhibited from entering the solder seal 30 from the coupling portion for the solder seal 30 and the remaining insulation coating 13.

Subsequently, a description will be given of steps of manufacturing an aluminum electric wire equipped with female terminal according to the present embodiment. First, as shown in FIG. 1, the end of the insulation coating 13 of the aluminum electric wire 10 is peeled off to expose the end of the core wire 11 by a predetermined length. The exposed end of the core wire 11 has a sufficient length of exposed portion for size management after crimping. For example, the length of the exposed end of the core wire 11 may be a size about twice the width of a barrel segment 25A of the wire barrel 25 of the female terminal fitting 20.

Next, the exposed end of the core wire 11 is impregnated with solder. Specifically, the gap between the strands 12 is impregnated with molten solder by the flow soldering, by which the end of the exposed core wire 11 is immersed fully into molten solder accumulated in a solder bath and the like. As the molten solder, lead-free solder is employed; actually, the present embodiment has employed lead-free solder having a component ratio of, for example, about 80% of Sn and about 20% of Zn. The solder having this component ratio features excellence in wettability with aluminum.

When the exposed core wire 11 is immersed fully into the molten solder, the wet molten solder applied over the core wire 11 comes in contact with the end of the remaining insulation coating 13. Therefore, the end of the remaining insulation coating 13 is melted by heat from the molten solder. The molten solder fills the gap between the strands 12 and is cooled to be solidified. Therefore, the solder seal 30 is formed. The molten insulation coating 13 penetrates the gap between the strands 12 and is cooled to be solidified in a condition where the molten insulation coating 13 is in contact with the solder seal 30. Therefore, the seal connection portion 14 is formed. Accordingly, the solder seal 30 and the remaining insulation coating 13 are sealed off from each other by the seal connection portion 14.

In such a manner, in the seal connection portion 14, the molten solder and the molten insulation coating 13 penetrate a gap between the strands 12 and then the molten insulation coating 13 is cooled to be solidified in a condition where the insulation coating 13 has penetrated into the core wire 11. As a result, the inside of the aluminum electric wire 10 and the solder seal 30 are sealed off from each other by the seal connection portion 14. Therefore, at the seal connection portion 14, water is inhibited from entering the solder seal 30 from the coupling portion for the solder seal 30 and the remaining insulation coating 13 and, at the same time, inhibited from entering the inside of the aluminum electric wire 10 to the solder seal 30.

Next, a crimping device is used to crimp and connect the female terminal fitting 20 to the end of the aluminum electric wire 10 on which the solder seal 30 is formed. In detail, the crimping device is equipped with an anvil and a crimper, to provide the solder seal 30 and the end of the remaining insulation coating 13 in the wire barrel 25 of the female terminal fitting 20 and the insulation barrel 26, respectively. In addition, both of the barrels 25 and 26 may be sandwiched between the anvil and the crimper to be crimped into an overlapping type (see FIG. 3). In such a manner, the core wire 11 and the female terminal fitting 20 are electrically connected to each other through the solder seal 30. This completes the work of connecting the female terminal fitting 20 to the end of the aluminum electric wire 10 according to the present embodiment.

A plurality of the thus formed aluminum electric wires 10 equipped with the female terminal 20 is assembled into a harness, for example. The female terminal fitting 20 on the terminal of this aluminum electric wire 10 may be housed in a female housing and arranged at a predetermined position in a vehicle, and this female housing may be fitted to the mating male housing to electrically connect the female terminal fitting 20 and the corresponding male terminal fitting to each other.

As described above, according to the present embodiment, even when water attaches the portion where the wire barrel 25 of the female terminal fitting 20 and the solder seal 30 are crimped to each other, electric corrosion does not occur because the wire barrel 25 and the solder seal 30, which are in contact with each other, are made of the same copper alloy. On the other hand, the inner surface of the solder seal 30 and the core wire 11 of the aluminum electric wire 10 are made of the different kinds of metals and come in contact with each other; however, the portion where they come in contact with each other, that is, the inside of the solder seal 30 is protected from water and, therefore, is not subject to electric corrosion. As a result, it is possible to securely prevent electric corrosion on the portion where the aluminum electric wire 10 and the female terminal fitting 20 are connected to each other, without using anti-corrosive agents.

Further, in the present embodiment, in order to connect the female terminal fitting 20 to the solder seal 30, the wire barrel 25 has been crimped and crimped to the solder seal 30 and the insulation barrel 26 has been crimped and crimped to the insulation coating 13. Therefore, no additional components need to be prepared as the female terminal fitting, thereby enabling applying the existing female terminal fitting 20 including the wire barrel 25 and the insulation barrel 26 as it is.

Figure 8:
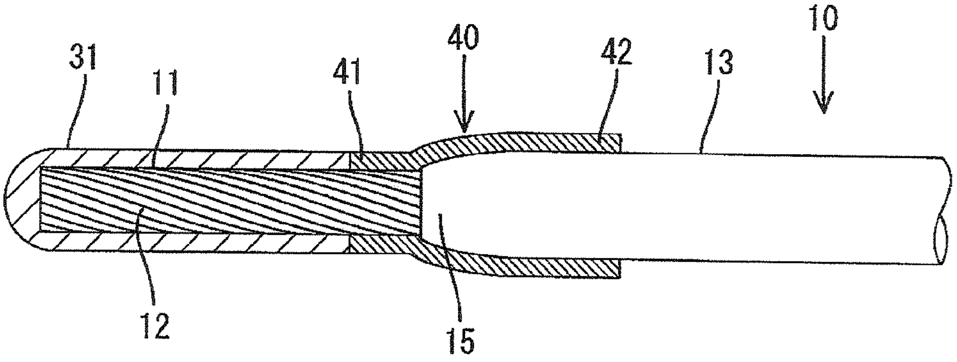
FIG. 8 is a side view showing a state where the solder seal is formed by crimping the sleeve of FIG. 4 to the end of the aluminum electric wire and soldering the exposed core wire projecting from the metal sleeve.
Figure 9:
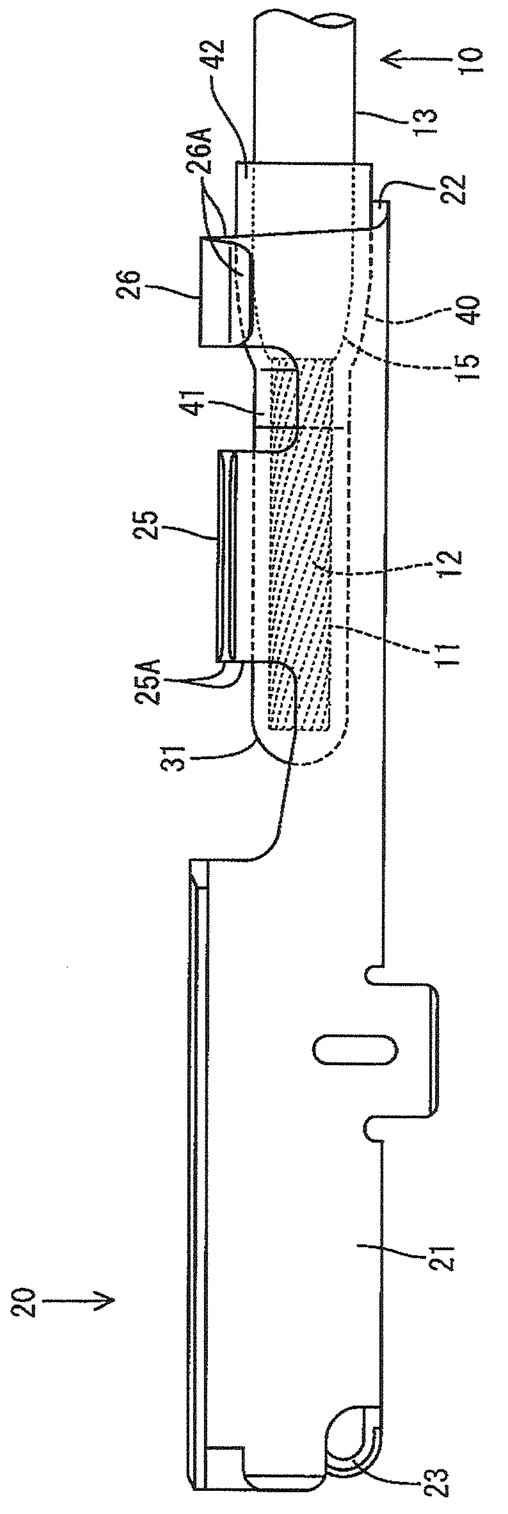
FIG. 9 is a side view showing a state where the wire barrel is crimped to the solder seal of FIG. 5 and the insulation barrel is crimped to the metal sleeve.

Next, a second embodiment of the present invention will be described with reference to FIGS. 7 to 9. The second embodiment has employed a metal sleeve 40 as a component corresponding to the seal connection portion 14 in the first embodiment and has the same configurations, actions, and effects as those of the first embodiment, and repetitive description will be omitted. Further, identical reference numerals are given to identical components in the first and second embodiments.

Figure 7:
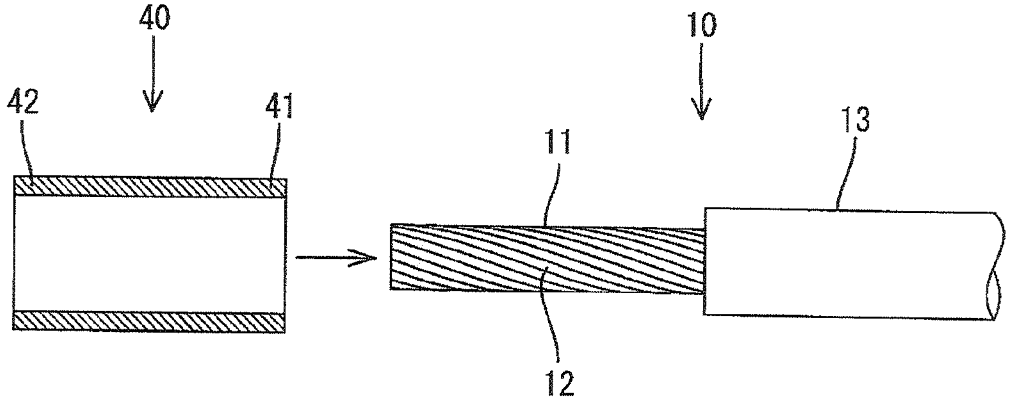
FIG. 7 is a partial side view showing a state before a metal sleeve is fit onto the end of the aluminum electric wire in a second embodiment.

The metal sleeve 40 has a cylindrical shape having two ends opened as shown in FIG. 7. The metal sleeve 40 is formed by beating a copper alloy-made plate material into a predetermined shape and making this beaten plate round into a cylindrical shape and welding ends to each other, for example. Further, an inner diameter of the metal sleeve 40 is substantially equal or somewhat larger than an outer diameter of an insulation coating 13 such that an aluminum electric wire 10 can be inserted through the metal sleeve 40.

Subsequently, a description will be given of steps of manufacturing an aluminum electric wire equipped with female terminal fitting according to the present embodiment. First, as shown in FIG. 7, the end of the insulation coating 13 of the aluminum electric wire 10 is peeled off to expose a core wire 11. The metal sleeve 40 is fit onto the outer circumferential surface of the exposed core wire 11.

The metal sleeve 40 is set to a state where the end of the insulation coating 13 remaining as a result of the peeling is permitted to overlap the other end side 42 of the metal sleeve 40 and the end portion of the exposed core wire 11, at the side of the insulation coating 13, projecting from the end of the insulation coating 13 is permitted to overlap with one end side 41 of the metal sleeve 40. In this state, as shown in FIG. 8, the crimping device is used to squeeze and crimp the other end side 42 of the metal sleeve 40 to the remaining insulation coating 13 and the one end side 41 of the metal sleeve 40 to the end portion of the exposed core wire 11, at the side of the insulation coating 13. The crimping is performed in almost the same way as in the first embodiment.

Because of the crimping, on the other end side 42 of the metal sleeve 40, the metal sleeve 40 and the remaining insulation coating 13 are sealed off from each other and the insulation coating 13 and the core wire 11 are sealed off from each other. Further, the end of the insulation coating 13 is embedded into the core wire 11 between the one end side 41 and the other end side 42 of the metal sleeve 40. Thus, an embedded portion 15 is formed at the end of the insulation coating 13. Therefore, besides being sealed by crimping of the other end side 42 of the metal sleeve 40, the inside of the aluminum electric wire 10 and the exposed core wire 11 are mostly sealed off from each other also over the embedded portion 15.

Next, the exposed core wire 11 projecting from the one end side 41 of the metal sleeve 40 is coated with solder. Specifically, the end of the exposed core wire 11 is impregnated with the solder by the flow soldering, by which the terminal is immersed fully into molten solder accumulated in a solder bath and the like. When the exposed core wire 11 is immersed fully into the molten solder, the wet molten solder applied over the core wire 11 impregnates an area from the exposed core wire 11 to the one end side 41 of the metal sleeve 40. When the molten solder having impregnated is cooled to be solidified, a solder seal 31 is formed. Accordingly, the solder seal 31 continues to the one end side 41 of the metal sleeve 40 by soldering, and the solder seal 31 and the one end side 41 of the metal sleeve 40 are sealed off from each other by soldering.

Further, the gap between the strands 12 is filled with the molten solder in the solder seal 31. Therefore, as this molten solder is cooled to be solidified, the inside of the aluminum electric wire 10 is sealed by the solder seal 31. Concurrently, heat from the molten solder is transferred through the metal sleeve 40 to the embedded portion 15 to melt the insulation coating 13 constituting the embedded portion 15. The gap between the strands 12 is impregnated with the molten insulation coating 13 in the embedded portion 15.

Moreover, the heat from the molten solder is transferred through the metal sleeve 40 to the other end side 42 to melt the insulation coating 13 on the other end side 42. Therefore, the insulation coating 13 is thermally welded to the inner circumferential surface of the other end side 42, thereby bringing the inner circumferential surface of the other end side 42 and the outer circumferential surface of the insulation coating 13 in close contact with each other. In such a manner, the other end side 42 of the metal sleeve 40 and the insulation coating 13 are sealed off from each other, thereby inhibiting water from entering the metal sleeve 40 from the other end side 42 of the metal sleeve 40.

Next, the crimping device is used to crimp and connect the female terminal fitting 20 to the end of the aluminum electric wire 10. In detail, the crimping device is set in a condition where the solder seal 31 is provided to the wire barrel 25 of the female terminal fitting 20, the metal sleeve 40 is provided to the insulation barrel 26, and the one end side 41 of the metal sleeve 40 is provided between the barrels 25 and 26. The barrels 25 and 26 may both be sandwiched by the anvil and the crimper and each crimped into an overlapping shape (see FIG. 9). In such a manner, the core wire 11 and the female terminal fitting 20 are electrically connected to each other through the solder seal 31. This completes to make the aluminum electric wire equipped with female terminal fitting according to the present embodiment.

As described above, according to the present embodiment, even when water attaches the portion where the wire barrel 25 of the female terminal fitting 20 and the solder seal 31 are crimped to each other, electric corrosion hardly occurs because the wire barrel 25 and the solder seal 31, which are in contact with each other, are made of the same copper alloy. On the other hand, the solder seal 31 and the core wire 11 of the aluminum electric wire 10 are made of the different kinds of metals and come in contact with each other; however, the portion where they come in contact with each other, that is, the inside of the solder seal 31 is protected from water. Therefore, the contacting portion is not subject to electric corrosion. As a result, it is possible to securely prevent electric corrosion on the portion where the aluminum electric wire 10 and the female terminal fitting 20 are connected to each other, without using anti-corrosive agents.

Figure 10:
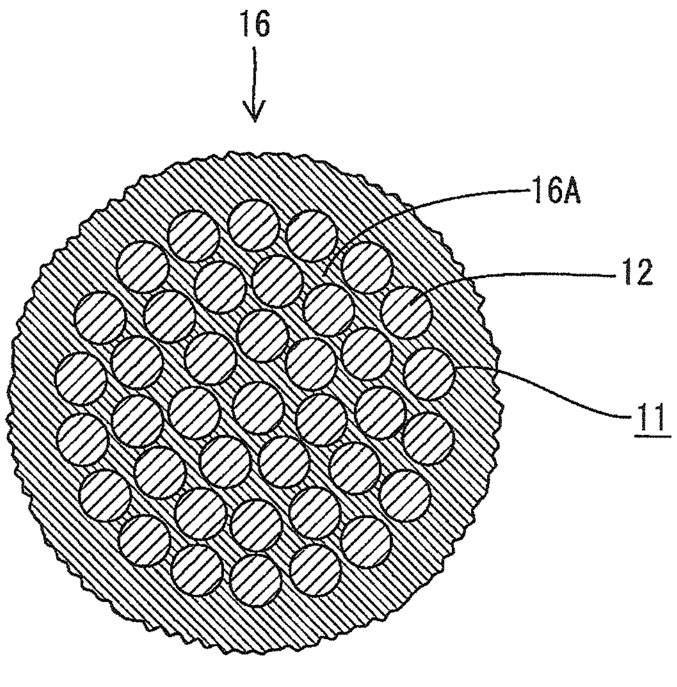
FIG. 10 is a cross-sectional view showing a seal connection portion in a third embodiment and corresponds to FIG. 6.

Next, a third embodiment of the present invention will be described with reference to FIG. 10. The third embodiment has partially changed the configuration of the seal connection portion 14 in the first embodiment and has almost the same configurations, actions, and effects as those of the first embodiment, and repetitive description on them will be omitted. Further, identical reference numerals are given to identical components in the first and third embodiments. That is, in a seal connection portion 16 of the third embodiment, the gap between strands 12 is filled with a coating penetrated portion 16A. This is performed by heating an insulation coating 13 to melt, sucking this molten insulation coating 13 into an inside of an aluminum electric wire 10, and cooling the coating 13 to be solidified. It is thus possible to configure the seal connection portion 16 only with the insulation coating 13.

The present invention is not limited to the embodiments defined by the above description and figures; for example, the following embodiments are also included in the technical scope of the present invention.

Although the above embodiments each has used a female terminal fitting equipped with both of a wire barrel and an insulation barrel, the female terminal fitting may be equipped with only the wire barrel without having the insulation barrel.

As for the wire barrel type, besides the overlapping shape exemplified in the anode embodiments, another type may be employed in which a pair of right and left barrel segments is disposed in a condition where they are shifted in the axial direction of the core wire or only one of the barrel segments is provided. Furthermore, a closed barrel type may be employed in which the barrels are formed into tubular before being crimped. It is preferable to have a shape such that the barrel does not damage the solder seal by sticking or the like when the barrel is crimped.

Although the above embodiments each have exemplified a female terminal fitting as the terminal fitting to be connected to the end of the aluminum electric wire, it may be any other terminal fitting such as a male terminal fitting including a male tab or an LA terminal including an eye ball-shaped connection portion.

The present invention may be applied not only to the configuration of connecting a copper alloy-made terminal fitting to the aluminum electric wire exemplified in the above embodiments but also widely to the configurations where the core wire of the electric wire and the terminal fitting connected thereto are made of different kinds of metals.

Although the above embodiments have crimped and crimped the solder seal, the present invention is not limited to this. The solder seal may be welded by using ultrasonic waves.

Although the second embodiment has squeezed and crimped the metal sleeve for sealing, the present invention is not limited to this. A heat shrinkable tube may be used as the sleeve to cover the core wire 11 and the insulation coating 13 to seal them off from each other.

The technology disclosed in the present description relates to an electric wire equipped with terminal fitting. The electric wire equipped with a terminal fitting includes: an electric wire including a metallic core wire coated with a coating; a terminal fitting made of a metal different from the metallic core wire; a solder seal formed of a solder containing a metal having an ionization tendency close to that of the terminal fitting as a main component; and a seal connection portion. The terminal fitting includes an electric wire connection portion connected to the electric wire. The solder seal seals an exposed portion of the metallic core wire that is exposed by removing a part of the coating of the electric wire. The electric wire connection portion is crimped on the solder seal. The seal connection portion connects the coating adjacent to the exposed portion of the metallic core wire and the solder seal to each other in a sealed manner.

The coating may be made of a resin to be melted at a melting point of the solder; and the seal connection portion may include a coating penetrated portion in which a part of the coating that is melted by heat from the solder melted during formation of the solder seal is penetrated between a plurality of strands constituting the metallic core wire.

The seal connection portion can be formed by soldering. That is, the seal connection portion need not be formed of a member different from the coating, thereby reducing the number of the components. Further, since the seal connection portion includes the coating penetrated portion, the seal connection portion can be connected to the solder seal by sealing, not only on the surface of the coating but also on the coating penetrated portion. Accordingly, the length of the seal portion along the boundary between the solder seal and the seal connection portion can be reduced to more enhance the seal effects.

The solder may fill a gap between the plurality of strands at the exposed portion of the metallic core wire; and the solder seal may include the coating penetrated portion and a solder impregnation portion in which the solder fills a gap between the plurality of strands.

The solder impregnation portion can be used for sealing even in the core wire to inhibit water from entering from the inside of the electric wire into the solder seal.

In addition to the configuration of the first means, the seal connection portion may include a sleeve having a cylindrical shape with openings at a first end and a second end, the solder seal is continuously connected to a first end side of the sleeve and an inner circumferential surface of the sleeve on a second end side is in close contact with an outer circumferential surface of the coating, and the sleeve is fitted on the exposed portion of the metallic core wire and a part of the coating that is continued from the exposed portion.

The exposed core wire can be covered by the sleeve and the solder seal by fitting the sleeve to the area from the exposed core wire over to the coating continuing to the core wire and providing the solder seal to one end side of the sleeve. Further, the sleeve and the coating can be sealed off from each other by bringing the inner circumferential surface of the other end side of the sleeve in close contact with the outer circumferential surface of the coating.

The sleeve may be made of a metal having an ionization tendency close to that of the terminal fitting, the sleeve being crimped to the exposed portion of the metallic core wire and a part of the coating adjacent to the exposed portion; and the solder seal may enclose the exposed portion of the metallic core wire that projects from the opening at the first end of the sleeve and the solder seal is soldered to the first end side of the sleeve.

Since the sleeve is made of metal, the solder seal can be continuously provided to the sleeve by soldering to the one end side of the sleeve. Further, the sleeve and the core wire are made of the different kinds of metals; however, the portion where the sleeve and the core wire come in contact with each other, that is, the inside of the sleeve is protected from water and, therefore, is not subject to electric corrosion. On the other hand, at the crimping portion of the wire connection portion, the metal pieces having the close ionization tendencies come in contact with each other. Therefore, even when water attaches to the crimping portion, electric corrosion hardly occurs.

A non-removed portion of the coating and the metallic core wire may be sealed off from each other by squeezing and crimping the second end side of the sleeve.

It is possible to inhibit water from entering from the outside of the sleeve into the sleeve and from the inside of the electric wire into the sleeve.

The electric wire connection portion may include a pair of barrel segments crimped to the solder seal; and the barrel segments may be crimped such that an outer circumference of the solder seal is embraced from right and left sides with projecting ends of the barrel segments overlapped with each other.

It is possible to apply the existing terminal fitting equipped with the wire barrel as it is.

The electric wire may be an aluminum electric wire including the metallic core wire made of aluminum or aluminum alloy; and the terminal fitting may be made of copper alloy.

It is possible to effectively prevent the occurrence of electric corrosion even when the aluminum electric wire likely to be subjected to electric corrosion is used.

The technology disclosed in the present specification features a method of manufacturing an electric wire equipped with a terminal fitting, the electric wire including: an electric wire including a metallic core wire coated with a coating; and a terminal fitting made of a metal different from that of the metallic core wire and including an electric wire connection portion. The method may sequentially include: removing an end of the coating of the electric wire to expose a part of the metallic core wire; soldering an area from the exposed portion of the metallic core wire in the electric wire to a part of the coating adjacent to the metallic core wire with a solder containing a metal having an ionization tendency close to that of the terminal fitting as a main component, thereby forming a solder seal; forming a seal connection portion connecting the solder seal and the coating adjacent to the end of the metallic core wire that is exposed, with the solder seal and the coating sealed off from each other; and crimping the electric wire connection portion of the terminal fitting to the solder seal.

It is possible to securely manufacture the electric wire equipped with terminal fitting disclosed in the present description.

The invention claimed is:

1. An electric wire equipped with a terminal fitting comprising:

an electric wire including a metallic core wire coated with a coating;

a terminal fitting made of a metal different from the metallic core wire, the terminal fitting including an electric wire connection portion connected to the electric wire;

a solder seal formed of a solder containing a metal having an ionization tendency close to that of the terminal fitting as a main component, the solder seal sealing an exposed portion of the metallic core wire that is exposed by removing a part of the coating of the electric wire, the electric wire connection portion being crimped on the solder seal; and a seal connection portion connecting the coating adjacent to the exposed portion of the metallic core wire and the solder seal to each other in a sealed manner.

2. The electric wire equipped with a terminal fitting according to claim 1, wherein:

the coating is made of a resin to be melted at a melting point of the solder; and the seal connection portion includes a coating penetrated portion in which a part of the coating that is melted by heat from the solder melted during formation of the solder seal is penetrated between a plurality of strands constituting the metallic core wire.

3. The electric wire equipped with a terminal fitting according to claim 2, wherein:

the solder fills a gap between the plurality of strands at the exposed portion of the metallic core wire; and the solder seal includes the coating penetrated portion and a solder impregnation portion in which the solder fills a gap between the plurality of strands.

4. The electric wire equipped with a terminal fitting according to claim 3, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

5. The electric wire equipped with a terminal fitting according to claim 1, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

6. The electric wire equipped with a terminal fitting according to claim 1, wherein the seal connection portion includes a sleeve having a cylindrical shape with openings at a first end and a second end, the solder seal is continuously connected to a first end side of the sleeve and an inner circumferential surface of the sleeve on a second end side is in close contact with an outer circumferential surface of the coating, and the sleeve is fitted on the exposed portion of the metallic core wire and a part of the coating that is continued from the exposed portion.

7. The electric wire equipped with a terminal fitting according to claim 6, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

8. The electric wire equipped with a terminal fitting according to claim 6, wherein:

the sleeve is made of a metal having an ionization tendency close to that of the terminal fitting, the sleeve being crimped to the exposed portion of the metallic core wire and a part of the coating adjacent to the exposed portion; and the solder seal encloses the exposed portion of the metallic core wire that projects from the opening at the first end of the sleeve and the solder seal is soldered to the first end side of the sleeve.

9. The electric wire equipped with a terminal fitting according to claim 8, wherein a non-removed portion of the coating and the metallic core wire are sealed off from each other by squeezing and crimping the second end side of the sleeve.

10. The electric wire equipped with a terminal fitting according to claim 9, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

11. The electric wire equipped with a terminal fitting according to claim 8, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

12. A method of manufacturing an electric wire equipped with a terminal fitting, the electric wire including: an electric wire including a metallic core wire coated with a coating; and a terminal fitting made of a metal different from that of the metallic core wire and including an electric wire connection portion, the method sequentially comprising:

removing an end of the coating of the electric wire to expose a part of the metallic core wire;

soldering an area from the exposed portion of the metallic core wire in the electric wire to a part of the coating adjacent to the metallic core wire with a solder containing a metal having an ionization tendency close to that of the terminal fitting as a main component, thereby forming a solder seal;

forming a seal connection portion connecting the solder seal and the coating adjacent to the end of the metallic core wire that is exposed, with the solder seal and the coating sealed off from each other; and crimping the electric wire connection portion of the terminal fitting to the solder seal.

13. The electric wire equipped with a terminal fitting according to claim 2, wherein:

the electric wire connection portion includes a pair of barrel segments crimped to the solder seal; and the barrel segments are crimped such that an outer circumference of the solder seal is embraced from right and left sides with projecting ends of the barrel segments overlapped with each other.

* * * * *